US010609518B2

(12) United States Patent
Hallett

(10) Patent No.: US 10,609,518 B2
(45) Date of Patent: Mar. 31, 2020

(54) HYBRID POSITIONING SYSTEM USING A REAL-TIME LOCATION SYSTEM AND ROBOTIC TOTAL STATION

(71) Applicant: Topcon Positioning Systems, Inc., Livermore, CA (US)

(72) Inventor: Jason Hallett, Dublin, CA (US)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

(21) Appl. No.: 16/224,034

(22) Filed: Dec. 18, 2018

(65) Prior Publication Data

US 2019/0141470 A1    May 9, 2019

Related U.S. Application Data

(63) Continuation of application No. 15/175,168, filed on Jun. 7, 2016, now Pat. No. 10,200,809.

(51) Int. Cl.
*H04W 4/029* (2018.01)
*G01S 19/48* (2010.01)
*G01S 5/02* (2010.01)

(52) U.S. Cl.
CPC ........... *H04W 4/029* (2018.02); *G01S 5/0263* (2013.01); *G01S 19/48* (2013.01); *Y10S 901/01* (2013.01)

(58) Field of Classification Search
None
See application file for complete search history.

(56) References Cited

U.S. PATENT DOCUMENTS

| | | | |
|---|---|---|---|
| 6,034,722 A | 3/2000 | Viney et al. | |
| 6,035,254 A | 3/2000 | Nichols | |
| 6,489,934 B1 | 12/2002 | Klausner | |
| 6,727,849 B1 | 4/2004 | Kirk et al. | |
| 7,212,563 B2 | 5/2007 | Boyd et al. | |
| 7,423,742 B2 | 9/2008 | Gatsios et al. | |
| 7,541,927 B2 | 6/2009 | Dupler et al. | |
| 9,255,798 B2 | 2/2016 | Kahlow | |
| 9,367,962 B2 | 6/2016 | Di Federico et al. | |
| 9,443,311 B2 | 9/2016 | Hallett | |
| 2006/0085813 A1 | 4/2006 | Giraldin et al. | |
| 2007/0019212 A1 | 1/2007 | Gatsios et al. | |
| 2009/0024325 A1* | 1/2009 | Scherzinger | G01C 15/06 702/5 |
| 2012/0323534 A1 | 12/2012 | Kahle et al. | |

(Continued)

FOREIGN PATENT DOCUMENTS

| | | |
|---|---|---|
| EP | 3054404 A1 | 8/2016 |
| EP | 3222969 A1 | 9/2017 |
| WO | 2007078832 A2 | 7/2007 |

OTHER PUBLICATIONS

International Search Report and Written Opinion dated Jul. 10, 2019, in connection with International Patent Application No. PCT/US2019/021277, 15 pgs.

(Continued)

*Primary Examiner* — Manuel A Rivera Vargas
(74) *Attorney, Agent, or Firm* — Chiesa Shahinian & Giantomasi PC

(57) ABSTRACT

A positioning system that combines the use of real-time location system and a robotic total station into a single, transparent hybrid positioning system to locate one or multiple targets by one or multiple users.

20 Claims, 7 Drawing Sheets

(56) References Cited

U.S. PATENT DOCUMENTS

| | | |
|---|---|---|
| 2013/0137079 A1 | 5/2013 | Kahle et al. |
| 2014/0267685 A1 | 9/2014 | Kahle et al. |
| 2014/0267772 A1 | 9/2014 | Morin et al. |
| 2014/0268064 A1 | 9/2014 | Kahle et al. |
| 2015/0285896 A1 | 10/2015 | Hall et al. |
| 2015/0369612 A1 | 12/2015 | Nishimura et al. |
| 2016/0133230 A1 | 5/2016 | Daniels et al. |
| 2017/0046868 A1 | 2/2017 | Chernov et al. |
| 2017/0353824 A1 | 12/2017 | Hallett |
| 2017/0374342 A1 | 12/2017 | Zhao |
| 2019/0213438 A1 | 7/2019 | Jones et al. |
| 2019/0235083 A1 | 8/2019 | Zhang et al. |
| 2019/0346271 A1 | 11/2019 | Zhang et al. |

OTHER PUBLICATIONS

"Redpoint RTLS Infrastructure," Redpoint Positioning, downloaded on Apr. 1, 2016 from http://redpointpositioning.com/products-services/infrastructure/, 2 pgs.

"High-Precision RTLS," Redpoint Positioning, downloaded on Apr. 1, 2016 from http://www.redpointpositioning.com/wp-content/uploads/2015/05/RP_SolutionsBrochure_WEB.pdf, 4 pgs.

"Redpoint RTLS Tags," Redpoint Positioning, downloaded on Apr. 1, 2016 from http://redpointpositioning.com/products-services/rtls-tags/, 2 pgs.

"High-Precision RTLS Solutions for Constructions," Redpoint Positioning, downloaded on Apr. 1, 2016 from http://www.redpointpositioning.com/rtls-for-vertical-industries/rtls-for-construction/, 3 pgs.

"Redpoint RTLS Products & Services," Redpoint Positioning, downloaded on Apr. 1, 2016 from http://redpointpositioning.com/products-services, 3 pgs.

Topcon PS Series Robotic Total Station, downloaded on Apr. 1, 2016 from https://www.topconpositioning.com/total-station-solutions/robotic-total-stations/ps-series, 4 pgs.

International Search Report and Written Opinion dated Jul. 19, 2017, in connection with International Patent Application No. PCT/US2017/031702, 12 pgs.

Notice of Allowance (Form PTOL-85) dated Dec. 16, 2019, in connection with U.S. Appl. No. 15/922,069, 21 pgs.

\* cited by examiner

HYBRID POSITIONING SYSTEM USING A REAL-TIME LOCATION SYSTEM AND ROBOTIC TOTAL STATION

This application is a continuation of prior application Ser. No. 15/175,168 filed on Jun. 7, 2016, the disclosures of which are herein incorporated by reference in their entirety.

TECHNICAL FIELD

The present invention relates to positioning systems, and, more particularly, to a hybrid positioning system utilizing a real-time location system (RTLS) in combination with a robotic total station (RTS) for precise position identification.

BACKGROUND

Real-time location systems are used to automatically identify and track the location of objects or people in real-time typically within a structure (e.g., hospital) or other enclosed area. Many such systems utilize wireless RTLS tags which are attached to the objects or worn by humans, and utilize fixed reference points which receive wireless signals from the RTLS tags to determine their current location. In typical operation, the RTLS tags (e.g., so-called "active" transponder tags) transmit a long-range signal (i.e., up to thousands of meters in accordance with recognized communications standards) at regular intervals, and location sensors receive and process the tag signals, and a location appliance collects and correlates the data for determining the current location of the object and/or person. In this way, RTLS typically allows for the positioning of multiple objects, usually in an indoor environment, in the range of tens of centimeters. RTLS is currently used in a variety of applications such as employee safety, workforce optimization, asset management, indoor navigation, and factory automation covering industries such as retail, construction, healthcare, manufacturing, education, and entertainment.

A robotic total station (also referred to as a "total station") is an electronic/optical instrument used in modern surveying and construction, for example. The robotic total station is an electronic theodolite integrated with an electronic distance meter (EDM) to read slope distances from the instrument to a particular point and allows for a single person to effectively locate a target with assistance. That is, robotic total stations eliminate the need for multiple persons at the location of the total station to acquire a set of measurements. In one use of a robotic total station, the single user is at the target and sights the total station visually from the target and, upon visually locating the robotic total station, the user initiates an angular scanning sequence at the robotic total station to obtain more precise angular and distance measurements. The robotic total station automatically aligns itself with the target using, for example, servo motors that cause the robotic total station to be rotated towards the target. Once the robotic total station is aligned with the target (which is reflective in nature and may utilize one or more reflectors or prisms for such purpose), the angle and distance measurements can be taken and the position of the target may be determined in real-time or at some later time after a survey is completed, for example. In this way, a robotic total station typically allows for the precise positioning, usually in an outdoor environment, of a single object in the millimeter range.

As will be appreciated, while the aforementioned RTLS and RTS each have respective strengths in their ability to provide positioning information they also have respective limitations with respect to applicable operating environments (i.e., indoor vs. outdoor) and potential positioning targets (i.e., one at a time vs. multiple).

Therefore, a need exists for an improved technique for combining the use of a RTLS and RTS into a single, transparent positioning system.

BRIEF SUMMARY OF THE EMBODIMENTS

In accordance with various embodiments, a positioning system is provided that combines the use of a real-time location system and a robotic total station into a single, transparent hybrid positioning system to locate one or multiple targets by one or multiple users.

More particularly, in accordance with an embodiment, the position of a target is determined using a hybrid positioning system that combines the use of both a RTLS and RTS which have been configured with, among other things, a positioning application to enable the delivery of transparent positioning capabilities. In accordance with an embodiment, one or more rovers on a site are monitored and a determination is made whether a rover's current position is at a distance that is greater than or equal to a specified distance (e.g., 20 cm) from a target location. If the distance of the current position is greater than equal to the specified distance, the rover is positioned using RTLS (and/or GNSS in accordance with a further embodiment). Otherwise, an alert is sent to the RTS and positioning of the rover is transitioned to the RTS from the RTLS as the rover's current position is at a distance that is now less than the specified distance from the target. Positioning continues under the control of the RTS until such time that the target's final position has been located and determined. At such time, the RTS is released for use by another user, if any, on the site for positioning another target.

These and other advantages of the embodiments will be apparent to those of ordinary skill in the art by reference to the following detailed description and the accompanying drawings.

DETAILED DESCRIPTION

In accordance with various embodiments, a positioning system is provided that combines the use of a real-time location system and a robotic total system into a single, transparent hybrid positioning system to locate one or multiple targets by one or multiple users.

Figure 1:
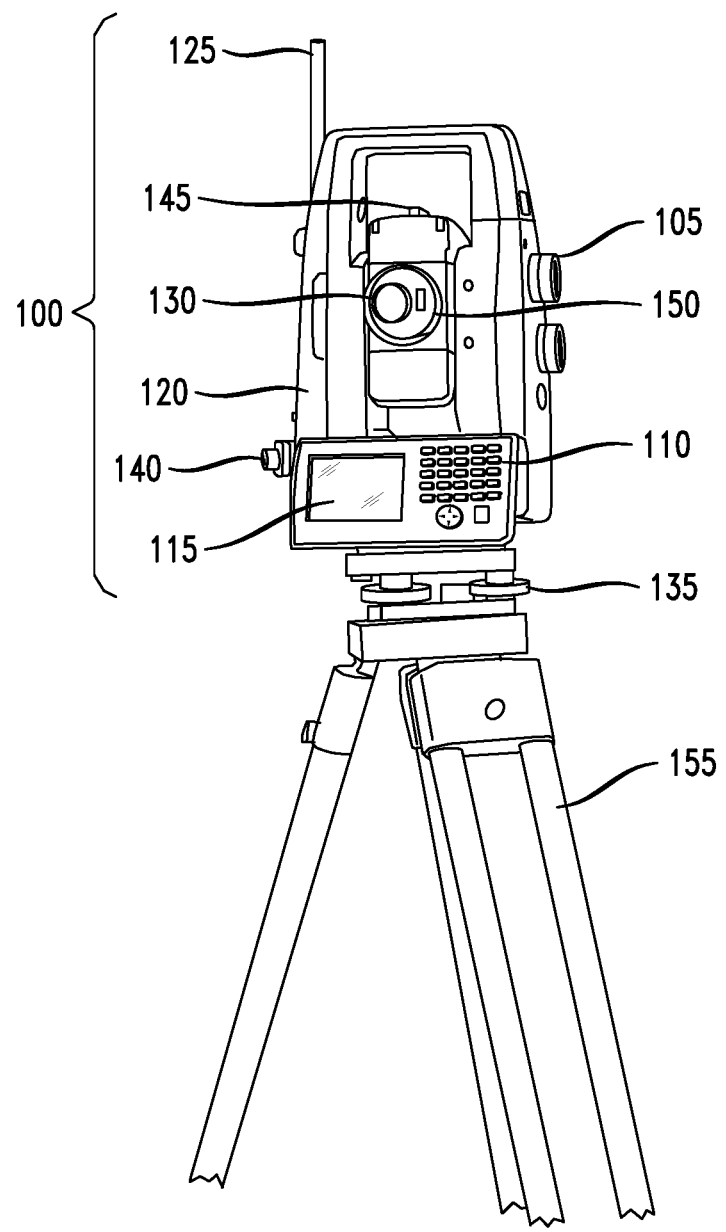
FIG. 1 shows an exemplary robotic total station configured in accordance with an embodiment.
Figure 2:
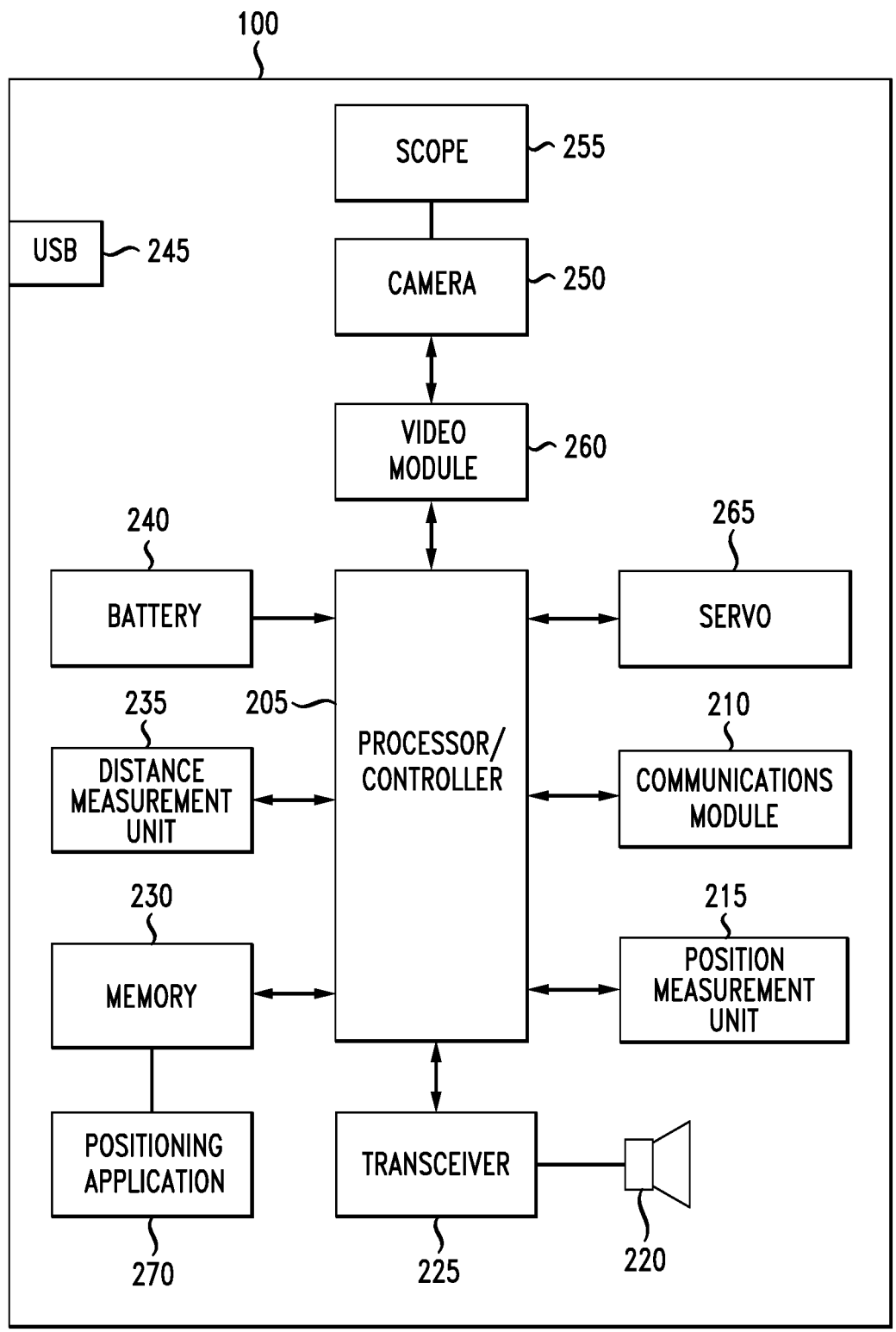
FIG. 2 shows a high-level block diagram of the robotic total station of FIG. 1 in accordance with an embodiment.

FIG. 1 shows an exemplary robotic total station 100 configured in accordance with an embodiment, and FIG. 2 shows a high-level block diagram of RTS 100 of FIG. 1 in accordance with an embodiment. For ease of explanation and understanding of the embodiments herein, these Figures will now be discussed together. As shown, RTS 100 includes conventional elements such as housing 120 (typically a waterproof and dustproof housing) including antenna 125, servos 105 (e.g., ultra-fast servo motors) for aiming an optical sighting apparatus such as telescope 255 shown in FIG. 2 (with telescope 255 having telescope eyepiece 130 and telescope focusing knob 150), sighting collimator 145, keypad 110 (e.g., a backlit 25 keyboard with directional arrow keys) for receiving commands from a human operator and display 115 (e.g., a color display) for displaying information to the human operator, for example. RTS 100 further includes servo(s) motors (e.g., servo(s) 265), leveling screws 135 and horizontal tangent screw 140 for controlling the position of RTS 100 which may be affixed to tripod 155 in a well-known fashion.

As further shown in FIG. 2, RTS 100 includes processor 205 for controlling the overall operation of RTS 100, an optical sighting apparatus such as telescope 255, video module 260 which may include a video semiconductor chip for providing compressed, digital video (e.g., MPEG-2) data from camera 250 to processor 205, distance measurement unit 235 for measuring distance from RTS 100 to a target using any number of well-known techniques, and position measurement unit 215 for detecting azimuth and elevation of optical sighting apparatus 255 using any number of well-known techniques. Processor 205 may include both general and special purpose microprocessors, and may be the sole processor or one of multiple processors of RTS 100. Processor 205 may comprise one or more central processing units (CPUs), for example, and may include, be supplemented by, or incorporated in, one or more application-specific integrated circuits (ASICs) and/or one or more field programmable gate arrays (FPGAs).

As will be appreciated, the operations of position measurement unit 215 and distance measurement unit 235 may be combined into a single unit in further embodiments. Battery 240 (e.g., lithium-ion) provides the overall power supply to RTS 100, and USB port 245 provides access to USB-type flash drives in a well-known way.

Transceiver 225 may be any device for transmitting and receiving data over a communications link (e.g., wireless data link) using antenna 220 in a conventional manner. Communications module 210 may provide RTS 100 with a variety of capabilities such as Bluetooth® communications. Memory 230 may comprise a tangible non-transitory computer readable storage medium, high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

In accordance with an embodiment, memory 230 stores various types of information (e.g., image data from camera 250, alphanumeric data or other types of data typically utilized by RTS 100) and positioning application 270 for execution by processor 205 which will integrate the operations of RTS 100 in a positioning system which combines the use of a RTLS and a RTS into a single, transparent hybrid positioning system to locate one or multiple targets by one or multiple users, as will be further detailed herein below.

Figure 3:
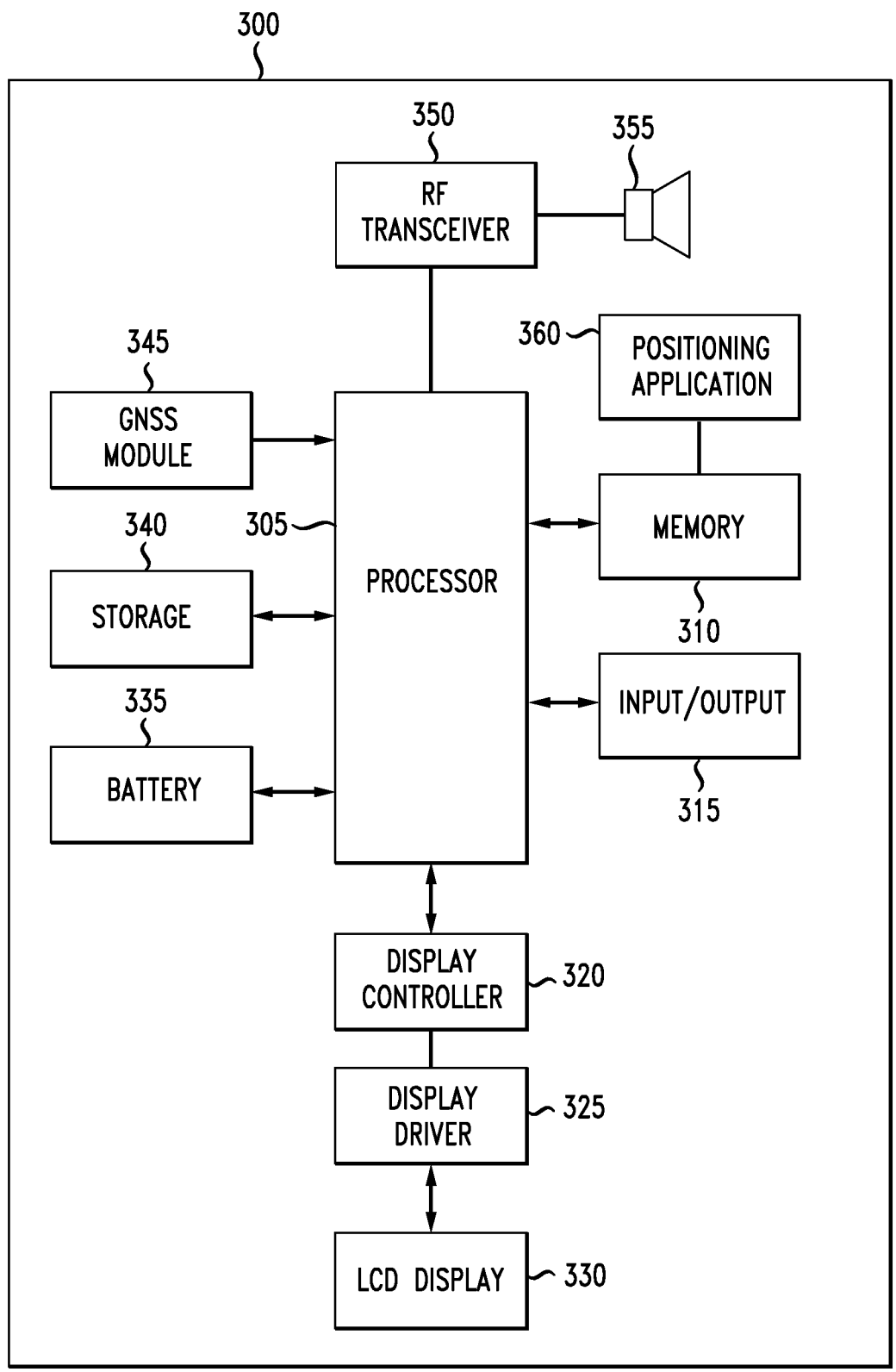
FIG. 3 shows a high-level block diagram of an exemplary mobile device configured in accordance with an embodiment.

FIG. 3 shows a high-level block diagram of an exemplary mobile device 300 configured in accordance with an embodiment for deployment by users in the transparent hybrid positioning system as detailed herein below. As shown, mobile device 300 (e.g., a smartphone, wearable computer, or tablet) includes processor 305 for controlling the overall operation of mobile device 300, antenna 355, radio frequency (RF) transceiver 350, and GNSS module 345 for receiving and transmitting information, from and to a variety of communications networks, in a conventional and well-known manner. Such information (e.g., data) may also be stored in data storage device 340 and/or memory 310 which each may comprise a tangible non-transitory computer readable storage medium, and/or include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

In accordance with an embodiment, memory 310 also stores positioning application 360 for execution by processor 305 which will integrate the operations of mobile device 300 in a positioning system which combines the use of a RTLS and a RTS (e.g., RTS 100) into a single, transparent hybrid positioning system to locate one or multiple targets by one or multiple users, as will be further detailed herein below.

Mobile device 300 further includes input/output devices 315 which may include peripherals, such as a camera, printer, scanner, display screen, etc. In the illustrative embodiment shown in FIG. 3, display controller 320 operates in conjunction with display driver 325 to display information on LCD display 330 to the user of mobile device 300. Battery 335 (e.g., lithium-ion) provides the overall power supply to mobile device 300 in a well-known fashion.

Figure 4:
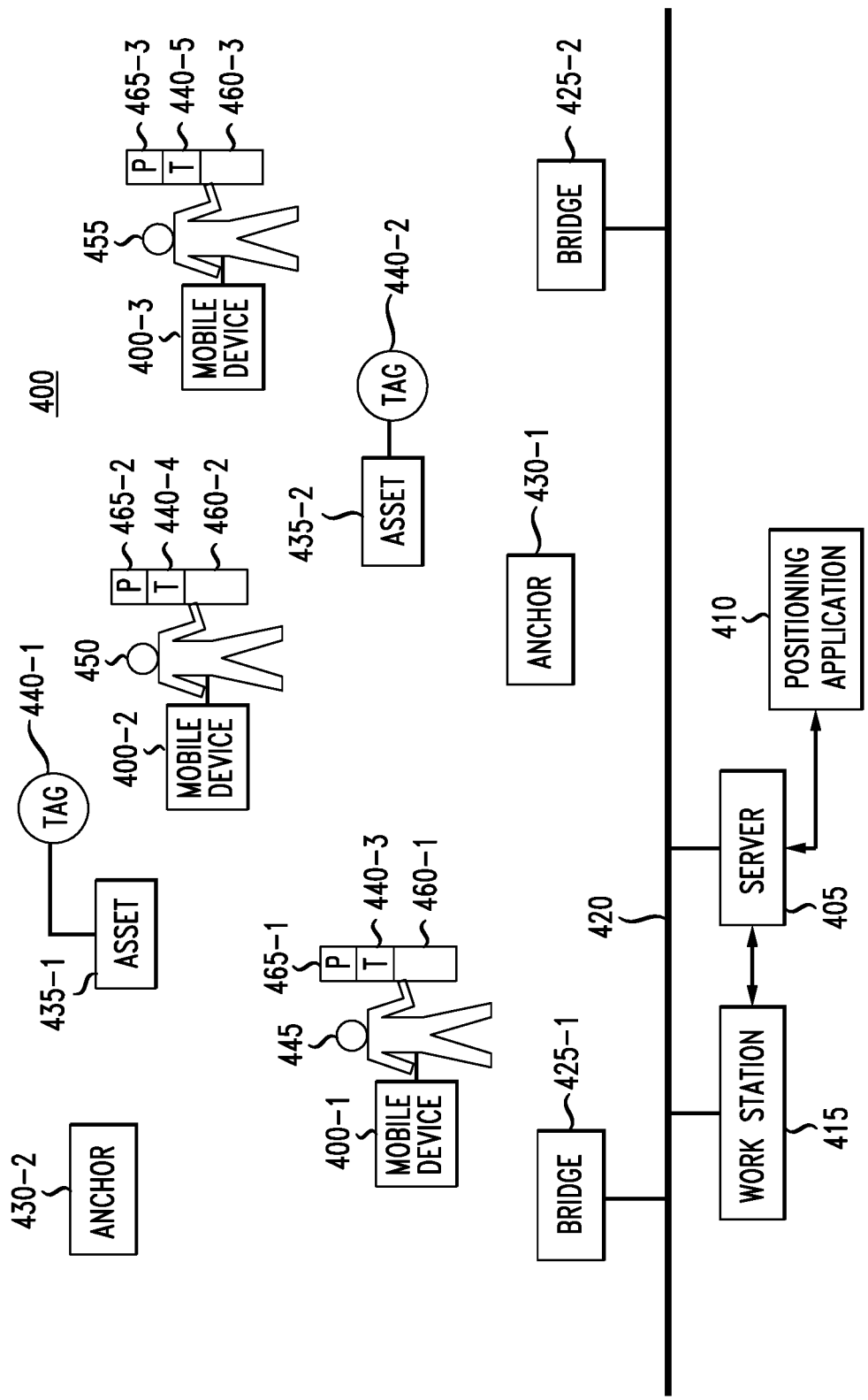
FIG. 4 shows a diagram of an exemplary real-time location system configured in accordance with an embodiment.

As noted previously, in accordance with various embodiments, a positioning system is provided that combines the use of RTLS and a RTS (e.g., RTS 100) into a single, transparent hybrid positioning system to locate one or multiple targets by one or multiple users. To that end, FIG. 4 shows an explanatory diagram of an exemplary real-time location system 400 configured in accordance with an embodiment. As shown, RTLS 400 includes server 405 interconnected with workstation 415 (e.g., a conventional computer) and communicating across communications link 420 (e.g., an Ethernet local area network). Server 405 has access to memory 470 for executing positioning application 410 which, in accordance with the embodiment, will integrate the operations of RTLS 400 in a positioning system which combines the use of RTLS 400 and RTS 100 into a single, transparent hybrid positioning system to locate one or multiple targets by one or multiple users, as will be further detailed herein below.

RTLS 400 includes anchors (i.e., anchor 430-1 and 430-2), bridges (i.e., bridge 425-1 and 425-2) and tags (i.e., tag 440-1, 440-2, 440-3, 440-4, and 440-5) which work in combination to deliver real-time location by RTLS 400 in a well-known manner. That is, tags 440-1 through 440-5 may be battery-operated mobile radio nodes that are affixed to a tangible object or people and utilized to track and/or navigate such objects and/or people. For example, tracking construction assets (e.g., equipment, tools, and materials such as assets 435-1 and 435-2) or personnel (e.g., persons 445, 450, and 455) on a particular worksite to improve asset utilization, minimize time spent locating critical construction assets, maximize workforce efficiency, enable resource allocation, and/or improve workflow optimization. Anchors 430-1 and 430-2 form a wireless mesh network (e.g., Bluetooth® or Ultra-Wide Band (UWB)), in a conventional manner, across RTLS 400 and are in contact with each other and all tags (e.g., tags 440-1, 440-2, 440-3, 440-4, and 440-5) that may be in their vicinity (typically fifty (50) meters for outside line-of-site environments, and thirty (30) meters for inside environments). Bridges 425-1 and 425-2 facilitate the communication of network traffic from tags 440-1, 440-2, 440-3, 440-4, and 440-5, for example, to server 405. As will be appreciated, any number of rovers, persons, tags, bridges, anchors, etc. can be configured in accordance with the principles of the embodiments herein.

In accordance with an embodiment, persons 445, 450, and 455 each are associated with a rover pole (also referred to herein as a "rover"), that is, rover poles 460-1, 460-2, and 460-3, respectively, with each such rover having at least one prism (i.e., prisms 465-1, 465-2, and 465-3, respectively) and at least one tag (i.e., tags 440-3, 440-4, and 440-5, respectively). Further, in accordance with the embodiment, persons 445, 450, and 455 are further associated with a respective mobile device (i.e., mobile devices 400-1, 400-2, and 400-3, respectively, each of which is configured the same as mobile device 300 as shown in FIG. 3).

Figure 5:
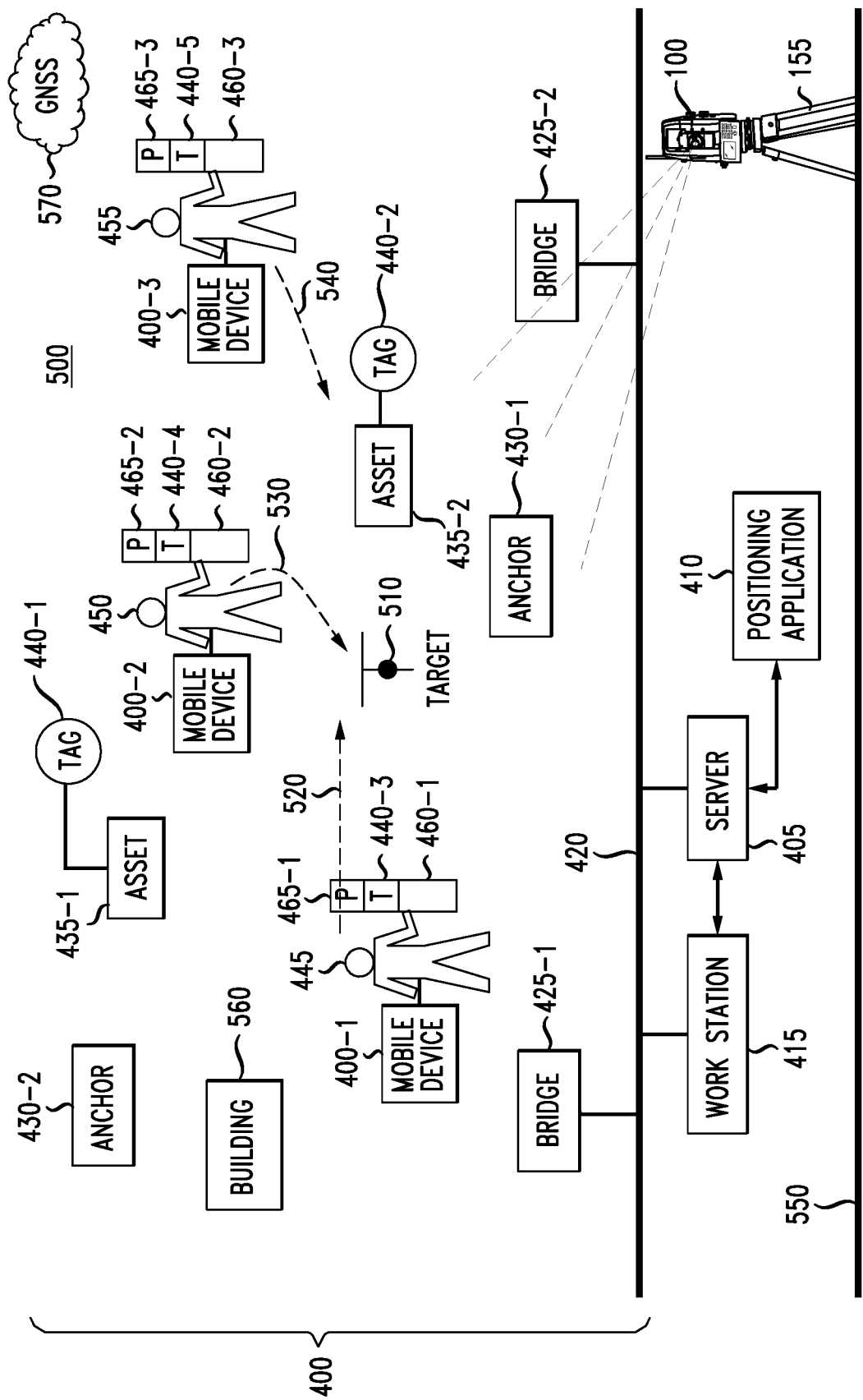
FIG. 5 shows a diagram of a hybrid positioning system using the RTLS shown in FIG. 4 and the RTS shown in FIGS. 1 and 2, respectively, for locating the position of a target in accordance with an embodiment.

Again, in accordance with various embodiments, a positioning system is provided that combines the use of RTLS 400 and RTS 100 into a single, transparent hybrid positioning system to locate one or multiple targets by one or multiple users. To that end, FIG. 5 shows a diagram of a hybrid positioning system 500 using RTLS 400 (as show in FIG. 4) and RTS 100 (as shown in FIGS. 1 and 2, respectively), for locating the position of a target in accordance with an embodiment. As shown, hybrid positioning system 500 incorporates both RTLS 400 and RTS 100 to delivery both outdoor and indoor positioning capabilities.

To illustrate certain features of the embodiment and enhance their understanding, an example will be described using both FIG. 5 and FIG. 6 which shows a diagram 600 of the use of hybrid positioning system 500 configured in accordance with an embodiment. For example, person 445 is working on site 550 and is carrying mobile device 400-1, and rover pole 460-1 which is configured with prism 465-1 and tag 440-3, as described above. Person 445, in this illustrative scenario, is moving on path 520 towards target 510 with the objective of determining the position of target 510 (i.e., the geographic coordinates) within site 550. Only person 445 is detailed in this example but it will be understood the principles apply equally to multiple persons on site 550, for example, person 450 traversing path 530 and person 455 traversing path 540 towards target 510. As will be appreciated, while FIGS. 4 and 5 show embodiments with RTS 100, workstation 415, server 405 and bridges 425-1 and 425-2 as separate units, these units (and the associated positioning application 410) may be integrated into a single unit (for example, entirely integrated within RTS 100) and/or other combinations of units in further embodiments consistent with the principles described herein.

Figure 6:
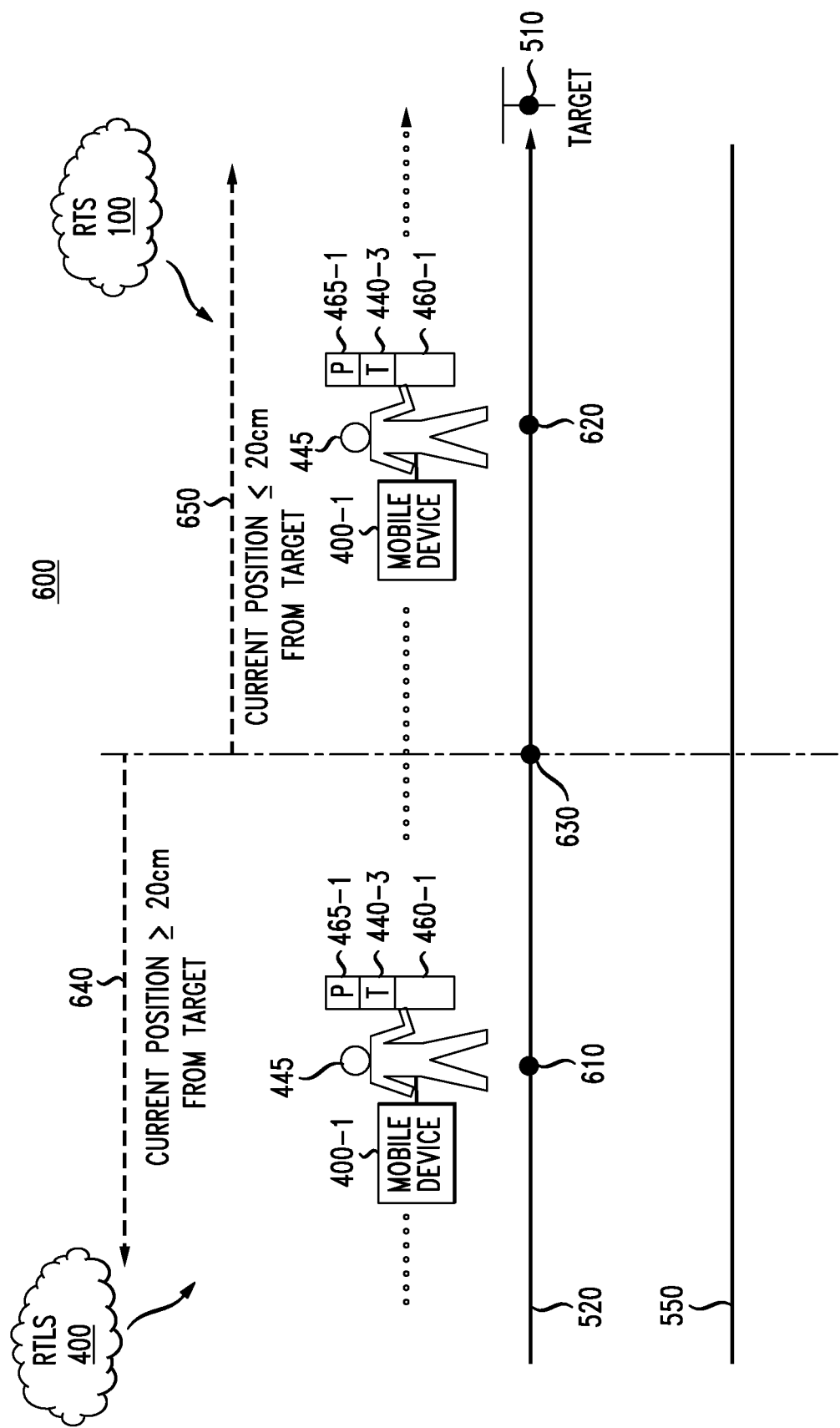
FIG. 6 shows a diagram of the use of the hybrid positioning system of FIG. 5 for locating the position of a target in accordance with an embodiment.

Turning our attention also to FIG. 6, person 445 moves along path 520 towards target 510 and, in accordance with an embodiment, the details with respect to the positioning of rover pole 460-1 along the entire path 520 (i.e., points along the entire path including but not limited to target 510) are determined by a combination of RTLS 400 and RTS 100 that work together and transparently. In particular, mobile device 400-1 and server 405 will cooperate to process and provide the positioning details such that for those positions that are greater than or equal to a specified distance from target 510 (e.g., shown as area 640) the positioning will be performed by RTLS 400, and for those positions that less than the specified distance from target 510 (e.g., shown as area 650) the positioning will be performed by RTS 100. In accordance with the embodiment shown in FIG. 6, the specified distance is twenty (20) centimeters such that RTLS 400 will be engaged for all positioning in area 640 of site 550, and RTS 100 will be engaged for all positioning in area 650. The specified distance parameter is a user (or system) defined setting that is typically based on the quality of positioning available from RTLS 400 and selected to facilitate the transparent handoff and switching from RTLS 400 to RTS 100, all without user intervention. As such, the specified distance setting may be incorporated directed into RTS 100, for example, as part of a manufacturer setting or may be specified directly by a user in the field. In essence, there is a transition point (e.g., point 630) along the path being traversed (e.g., path 520) at which a transparent and seamless hand-off of positional processing will occur between RTLS 400 and RTS 100, such hand-off being coordinated by mobile device 400-1 and server 405. Essentially, providing an "on-the-fly" transition between RTLS 400 and RTS 100 without user intervention.

For example, when person 445 is at point 610, located within area 640, mobile device 300 and server 405 will be cooperatively monitoring the position of person 445 and determine that person 445 (and rover pole 460-1) are more than 20 centimeters away from target 510. That is, server 405, by and through positioning application 410, will be monitoring the respective positions of rover pole 460-1 and while rover pole 460-1 remains in area 640 (e.g., greater than 20 cm from the target) and designating RTLS 400 as the positioning provider. However, when server 405 detects that rover pole 460-1 has transitioned from area 640 into area 650, server 405 will send an alert message to mobile device 400-1 of such transition (shown illustratively as transition point 620) and for changing the positioning provider to RTS 100 from RTLS 400. In turn, mobile device 400-1, by and through positioning application 360 (see, FIG. 3), will send a message to RTS 100 that will trigger the RTS 100 to lock onto prism 465-1 of rover pole 460-1. The message sent to RTS 100 by mobile device 400-1 will include at least a search command and an angle to turn RTS 100 in order to locate and lock onto prism 465-1.

At this point, with rover 460 being less than the specified distance from the target, the positioning of rover pole 460-1 including the final position determination for target 510 will be solely performed by RTS 100. Advantageously, in accordance with embodiment, this allows for a multi-rover use of RTS 100, that is, as different rovers (e.g., rover pole 460-2 and/or 460-3) also approach target 510 the hybrid positioning system 500 will facilitate the delivery of precise positioning from a single robotic total station in a multi-user environment. Once RTS 100 has determined a particular target's position it can be used for a next user requiring positioning operations. Essentially, RTS 100 may be released to other users on the site thereby allowing for a shared positioning resource among these users. As such, this will produce increased productivity on a worksite and/or reduce down time due to sight obstructions on the worksite in locating a target (i.e., there is no need for any line of sight positioning until such time that hybrid positioning system 600 calls for, and transitions over to, RTS 100 from RTLS 400).

Further, while the illustrative example of FIG. 6 is primarily an outdoor environment, the principles of the embodiment are equally applicable to an indoor environment and/or a mixed indoor and outdoor environment. For example, in a further embodiment, RTLS 400 will be used for positioning for both indoor and outdoor environment, and RTS 100 will be used in the outdoor environment. Thus, for example, person 445 while traversing path 520 may start off in a building (e.g., building 560) located on site 550 in which RTLS 400 will maintain positioning responsibilities and as person 445 traverses path 520 these responsibilities will be passed to RTS 100, as detailed above, when person 445 moves outside of building 560 and into other areas of site 550 (e.g., area 650). In accordance with a further embodiment, outdoor positioning can be also optionally delivered by GNSS network 570 (e.g., the US Global Positioning System (GPS), the Russian GLONASS or European GALILEO, as are well-known).

Figure 7:
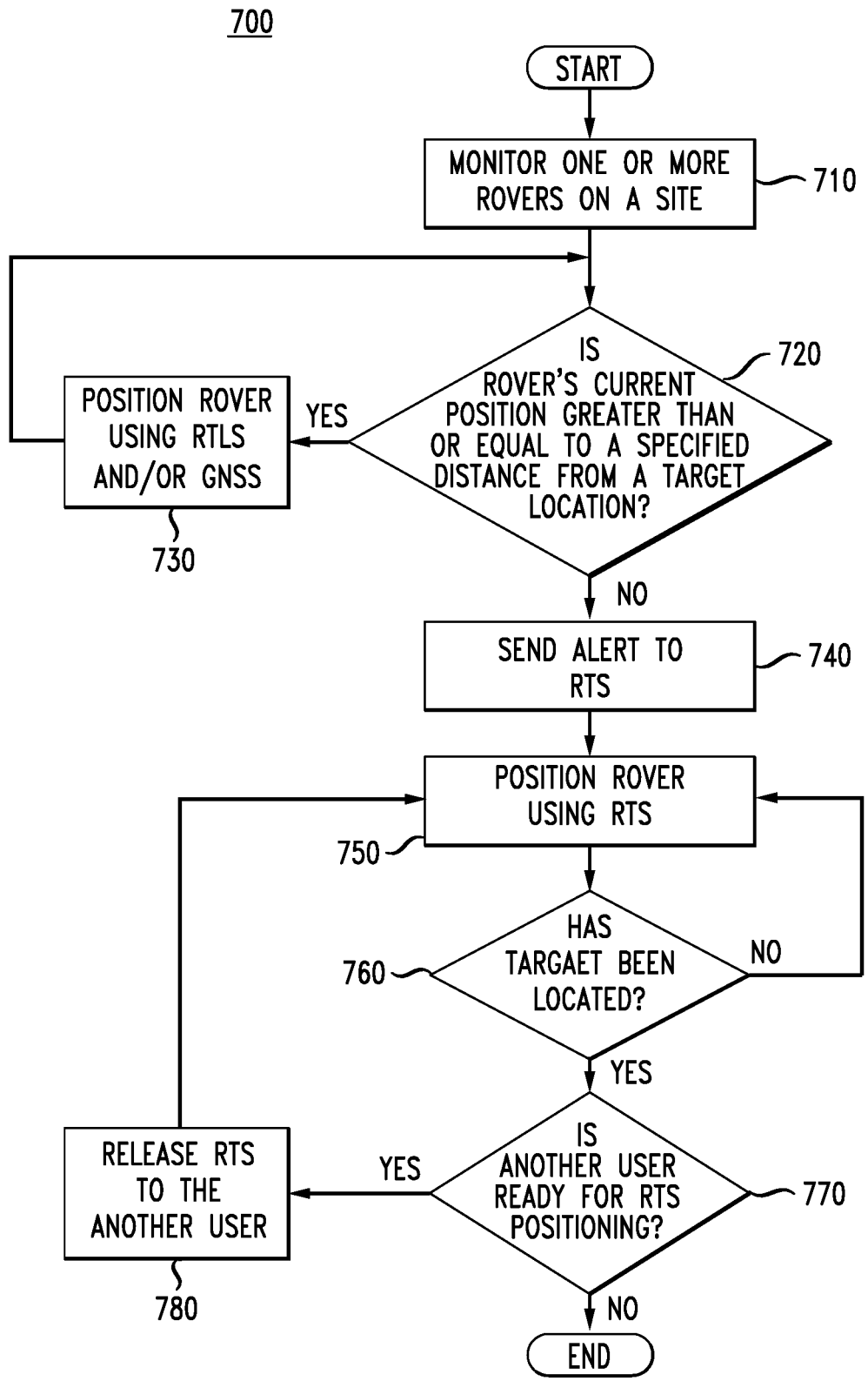
FIG. 7 shows a flowchart of illustrative operations for locating the position of a target using the hybrid positioning system of FIG. 5 in accordance with an embodiment.

FIG. 7 shows a flowchart of illustrative operations 700 for locating the position of a target using the hybrid positioning system (e.g., hybrid positioning system 560) in accordance with an embodiment. In accordance with the operations of FIG. 7, at step 710, one or more rovers on a site are monitored and, at step 720, a determination is made whether a rover's current position is greater than or equal to a specified distance (e.g., 20 cm) from a target location, as detailed above. If the current position is greater than equal to the specified distance, at step 730, the rover is positioned using RTLS and/or GNSS, otherwise, at step 740, an alert is sent to an RTS and positioning of the rover is transitioned to the RTS, at step 750, from the RTLS, as detailed above, as the rover's current position is now less than the specified distance (e.g., 20 cm) from the target. At step 760, if the target has not been located then positioning continues by the RTS until the target is located. After the target has been located, a determination is made, at step 770, if there is another user requiring access to the RTS, and if so, the RTS is released for use by another user at step 780.

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for locating a target on a site, comprising:
at a mobile device that is in communication with a server, monitoring a current position of a locating device traversing the site, wherein the locating device is associated with the mobile device and wherein positioning of the locating device is performed by a first positioning system when the current position is at a distance that is greater than or equal to a specified distance from the target;
receiving a first message at the mobile device from the server when the distance is less than the specified distance; and
responsive to the first message, transmitting a second message from the mobile device to a robotic total station (RTS) system to effect a transfer of control from the first positioning system to the RTS for positioning of the locating device by the RTS until a final position for the target has been located on the site.

2. The method of claim 1, wherein the second message comprises a search command and directional information to facilitate a hand-off for the RTS to establish control of the locating device.

3. The method of claim 1, wherein the mobile device is separate from the locating device.

4. The method of claim 1, wherein the locating device is associated with a user.

5. The method of claim 4, wherein the mobile device is associated with the user.

6. The method of claim 1, wherein the locating device is a rover.

7. The method of claim 1, wherein the first positioning system is one of a real-time location system (RTLS) and a Global Navigation Satellite System (GNSS).

8. The method of claim 1, wherein the first positioning system uses both a Global Navigation Satellite System (GNSS) and a real-time location system (RTLS) for positioning of the locating device.

9. The method of claim 1, wherein the specified distance is twenty (20) centimeters.

10. The method of claim 1, wherein the mobile device is one of a smartphone, a wearable computer, and a tablet.

11. A mobile device for locating a target on a site, comprising:
- a processor; and
- a memory coupled with the processor, the memory having a program that stores computer program instructions that when executed cause the processor to perform operations for:
- monitoring, in cooperation with a server, a current position of a locating device traversing the site, wherein the locating device is associated with the mobile device and wherein positioning of the locating device is performed by a first positioning system when the current position is at a distance that is greater than or equal to a specified distance from the target;
- receiving a first message from the server when the distance is less than the specified distance; and
- responsive to the first message, transmitting a second message to a robotic total station (RTS) system to effect a transfer of control from the first positioning system to the RTS for positioning of the locating device by the RTS until a final position for the target has been located on the site.

12. The mobile device of claim 11, further comprising one or more peripheral devices selected from the group consisting of a camera, a printer, a scanner, and a display.

13. The mobile device of claim 11, further comprising a transceiver for wirelessly transmitting and receiving data from the server.

14. The mobile device of claim 11, wherein the second message comprises a search command and directional information to facilitate a hand-off for the RTS to establish control of the locating device.

15. The mobile device of claim 11, wherein the first positioning system is one of a real-time location system (RTLS) and a Global Navigation Satellite System (GNSS).

16. The mobile device of claim 11, wherein the first positioning system uses both a Global Navigation Satellite System (GNSS) and a real-time location system (RTLS) for positioning of the locating device.

17. The mobile device of claim 11, wherein the specified distance is twenty (20) centimeters.

18. The mobile device of claim 11, wherein the mobile device is separate from the locating device.

19. The mobile device of claim 11, wherein the locating device is associated with a user and wherein the mobile device is associated with the user.

20. The mobile device of claim 11, wherein the mobile device is one of a smartphone, a wearable computer, and a tablet.

* * * * *